US007539803B2

(12) United States Patent
Fischer et al.

(10) Patent No.: US 7,539,803 B2
(45) Date of Patent: May 26, 2009

(54) BI-DIRECTIONAL INTERFACE FOR LOW DATA RATE APPLICATION

(75) Inventors: Jonathan H. Fischer, Longmont, CO (US); Walter G. Soto, Irvine, CA (US)

(73) Assignee: Agere Systems Inc., Allentown, PA (US)

( * ) Notice: Subject to any disclaimer, the term of this patent is extended or adjusted under 35 U.S.C. 154(b) by 744 days.

(21) Appl. No.: 10/461,671

(22) Filed: Jun. 13, 2003

(65) Prior Publication Data
US 2004/0252078 A1 Dec. 16, 2004

(51) Int. Cl.
G06F 13/42 (2006.01)
G06F 13/372 (2006.01)
G06F 13/14 (2006.01)
G06F 1/04 (2006.01)
G06F 1/14 (2006.01)

(52) U.S. Cl. .................. 710/106; 710/105; 710/124; 710/305; 713/502

(58) Field of Classification Search .............. 710/8, 710/11, 29, 31, 45, 69, 71–72, 105–106, 710/117, 124, 305; 713/502, 600; 340/10.1–10.6
See application file for complete search history.

(56) References Cited

U.S. PATENT DOCUMENTS

| | | | | |
|---|---|---|---|---|
| 3,993,867 A | * | 11/1976 | Blood, Jr. .................. 370/284 |
| 4,556,958 A | * | 12/1985 | Ugon ......................... 714/49 |
| 5,210,846 A | * | 5/1993 | Lee ............................ 710/115 |
| 6,697,897 B1 | * | 2/2004 | Friel et al. ................. 710/105 |
| 6,831,925 B1 | * | 12/2004 | Subrahmanyan et al. .... 370/447 |
| 6,934,779 B1 | * | 8/2005 | Broach ........................ 710/69 |
| 2001/0028297 A1 | * | 10/2001 | Hara et al. ................. 340/5.62 |
| 2001/0030617 A1 | * | 10/2001 | Cusey ......................... 341/119 |
| 2003/0023777 A1 | * | 1/2003 | Fields et al. .................. 710/3 |
| 2003/0035328 A1 | * | 2/2003 | Hamamatsu et al. ........ 365/200 |
| 2003/0164752 A1 | * | 9/2003 | Haimovitch et al. ..... 340/10.34 |

FOREIGN PATENT DOCUMENTS

DE 10003705 A1 * 8/2001

OTHER PUBLICATIONS

"Using a UART to Implement a 1-Wire Bus Master". Application Note 214. Dallas Semiconductor. Sep. 9, 2002.*
"Using the DS2480B Serial 1-Wire Line Driver". Application Note 192. Dallas Semiconductor. Mar. 12, 2002.*
"Ultra Reliable 1-Wire Communications". Application Note 159. Dallas Semiconductor. Feb. 4, 2002.*
"Guidelines for Reliable 1-Wire Networks". Application Note 148. Dallas Semiconductor. Nov. 16, 2001.*
Awtrey, Dan. "Transmitting Data and Power over a One-Wire Bus". Sensors—The Journal of Applied Sensing Technology. Feb. 1997.*

* cited by examiner

Primary Examiner—Thomas J Cleary

(57) ABSTRACT

A bi-directional single-conductor interface is provided, comprising (1) a switching means for applying a voltage level to the interface that is outside a normal voltage operating range for the interface and for removing the applied voltage level at an end of a specified time duration; and (2) a timer initiated by detection of the applied voltage and arranged to include a timing interval following removal of the applied voltage. With the interface of the invention, data is caused to be transmitted via the interface in a first direction during the timing interval of the timer, and in an opposite direction during other times.

17 Claims, 7 Drawing Sheets

US 7,539,803 B2

BI-DIRECTIONAL INTERFACE FOR LOW DATA RATE APPLICATION

FIELD OF INVENTION

This invention relates to optical transmission and particularly to an interface for communication of system information among components of an optical transceiver.

BACKGROUND OF THE INVENTION

In the current art, communications signals are regularly transported through networks via optical transmission arrangements in order to take advantage of the larger bandwidth available with optical signals transported over fiber optic media. In simple terms, such optical transport is effected by conversion of an electrical signal to be transmitted into a light signal through the use of a Laser Driver and laser diode which is interfaced to a fiber optic cable. At the receiving end, the transmitted light signal is converted back to an electrical signal by a photo diode. In practice, a Laser Driver (and associated electronics) is usually arranged in combination with a photo diode (and its associated electronics) into an opto-electronic transceiver module for providing two-way communication at a deployed location.

Opto-electronic transceiver modules provide for the bi-directional transmission of data between an electrical interface and an optical data link. The module receives electrically encoded data signals that are converted into optical signals and transmitted over the optical data link. Likewise, the module receives optically encoded data signals that are converted into electrical signals and transmitted onto the electrical interface.

In response to increasing demand for network channel capacity, as well as cost constraints, a Small Form Factor (SFF) standard evolved during the 1990s to reduce the size of many networking components. One such component, an SFF opto-electronic transceiver and its associated connector, mates with a receptacle in an equipment panel that is approximately the size of an RJ-45 jack (and approximately one-half the size of the prior connection arrangement). Thus, a considerably higher port density for fiber terminations can be achieved with the use of SFF opto-electronic transceivers.

The SFF standard for opto-electronic transceivers specifies minimum transceiver functionality and spells out transceiver physical dimensions. The module dimensions result in tight size constraints for the transceiver components. The receive part of the transceiver typically uses a photodiode (which converts an input light signal to an output current) combined with a transimpedance amplifier (TIA) to convert the photodiode output into a voltage for further processing and data recovery. The photodiode and TIA are usually mounted together in a package known as a "TO" can in order to keep the parasitic capacitance and inductance to a minimum for high data-rate transmission systems (e.g., 2.5 Gb/s and higher data rates). That combination of photodiode and TIA mounted in a TO-can will be referred to herein from time to time as the "receive module."

The TO-can must be small to fit inside the SFF transceiver, and this size constraint severely limits the TO-can pin count. The photodiode of the receive module is usually either a PIN diode or an avalanche photo diode (APD). Most PIN diode applications use 4-pin TO-cans and APD diode applications use 5-pin TO-cans.

SUMMARY OF THE INVENTION

There is a need to communicate one or more new information signals to the receive module of an SFF transceiver without adding pins to the TO-can housing that module. To that end, the invention provides a bi-directional communications interface that can be implemented using, at most, one additional pin of the receive module TO-can.

In particular, the invention provides a bi-directional single-conductor interface comprising (1) a switching means for applying a voltage level to the interface that is outside a normal voltage operating range for the interface and for removing the applied voltage level at an end of a specified time duration; and (2) a timer initiated by detection of the applied voltage and arranged to include a timing interval following removal of the applied voltage. With the interface of the invention, data is caused to be transmitted via the interface in a first direction during the timing interval of the timer, and in an opposite direction during other times.

DETAILED DESCRIPTION OF THE INVENTION

In a typical application for a network provisioned with optical transmission media, a transceiver module is interfaced with a host device—such as a switch, hub, router, optical distribution frame and the like—via a compatible connection port. As indicated in the Background section, an objective of higher port density and cost reduction led in the 1990s to the development of a Small Form Factor standard for various network components. Specifically for optical transceivers, the SFF standard was adopted pursuant to the Small Form-Factor Pluggable Transceiver MultiSource Agreement, which was finally adopted by the industry participants in 2000. In addition to the details of the electrical interface, this standard defines the physical size and shape for the SFP transceiver modules, and the corresponding host port, so as to insure interoperability between different manufacturers' products.

Figure 1:
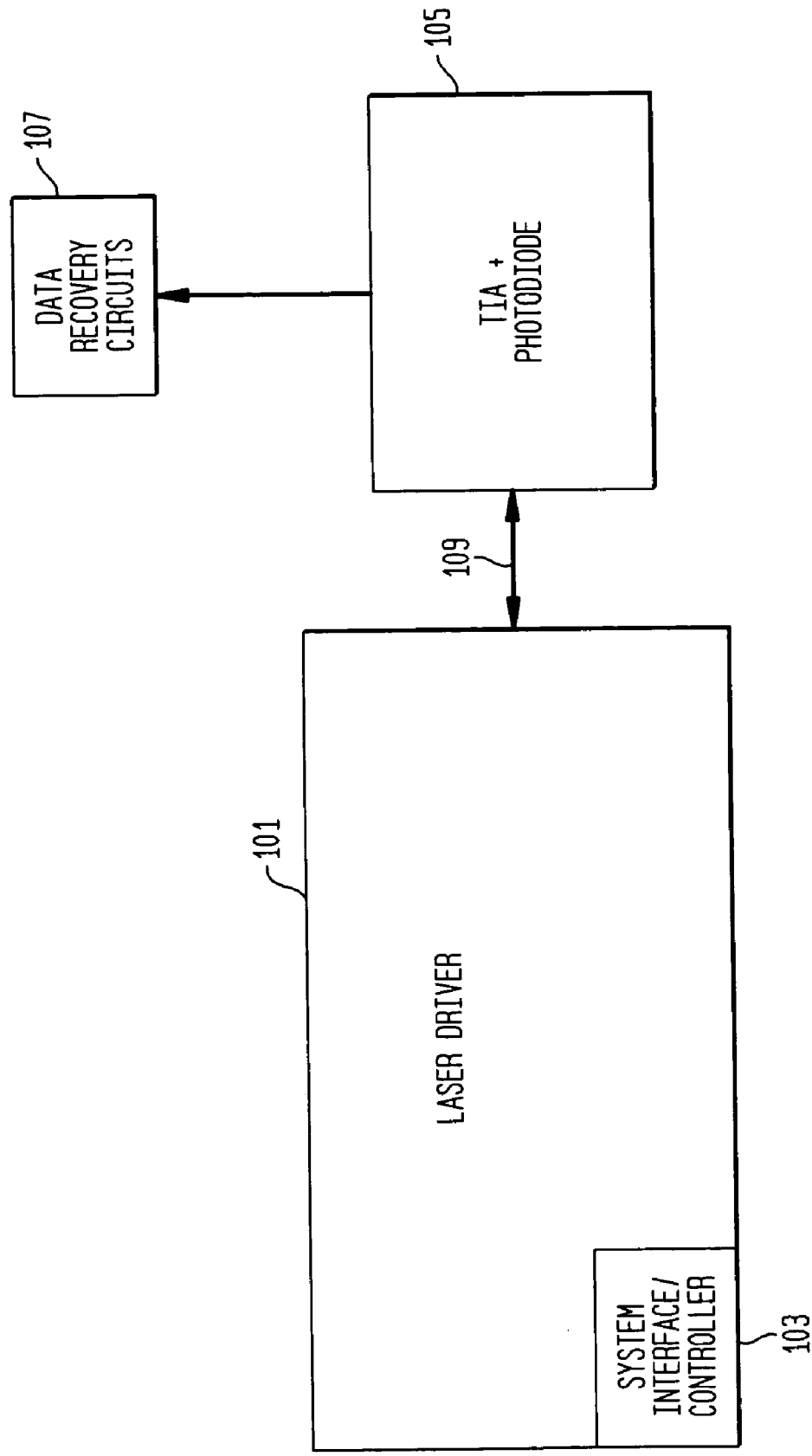
FIG. 1 schematically depicts an SFF optical transceiver.

A functional schematic of an SFF optical transceiver is shown in FIG. 1. With reference to the figure, the Laser Driver 101 and the included System Interface 103 constitute the transmitter portion of the transceiver, while the receiver portion includes the Transimpedance Amplifier (TIA) and Photodiode module 105 operating in combination with the Data Recovery Circuits 107 (for processing the received information—output from the TIA). The System Interface 103 associated with the Laser Driver 101 operates to handle the communication of system information between the SFF optical transceiver and the outside world. For example, if a system operator wanted to program new system parameters into the TIA of the transceiver, those parameters would initially be sent to the System Interface portion of the Laser Driver. Then the Laser Driver would send those new parameters to the TIA via the interface 109 shown in FIG. 1.

A need has arisen to add additional signals between the Laser Driver and the Photodiode-TIA module. However, there are severe constraints on the communication interface between those elements of the SFF transceiver. As noted in the Background section the Photodiode and the TIA are packaged together in a TO can package to accommodate a requirement for close proximity between these two elements of the receiver. To this end, the TIA is constituted as a very small chip, partly to comport with the limited space available in the TO can and partly to address cost constraints.

Preferably, the additional signals to be communicated between the Laser Driver and the photodiode-TIA module will be transmitted via a bi-directional interface using a single additional pin for the Photodiode-TIA module—i.e., using a 5-pin TO can package for PIN photodiode applications or a 6-pin TO can package for APD photodiode applications. Otherwise, if more than one additional pin is required for the communication of these additional signals (at least in the case of an APD photodiode), it will be necessary to change the module packaging to a relatively non-standard 7 pin TO can package. This would result in not only higher costs for the new packaging, but, potentially, reliability problems as well.

While bi-directional interfaces are known that could be implemented via a single conductor, such as a single pin of the Photodiode-TIA module package, those known interfaces require that various timing signals be sent back and forth between sender and receiver. To accommodate such an interface, significant new functionality would have to be added to the TIA to address those additional timing signals. Such additional functionality would not only be very difficult to achieve given the highly limited space available for the TIA, but would also cause a significant increase in the cost of the module.

Recognizing that the communication of the additional signals between the Laser Driver and the Photodiode-TIA module can be implemented at a relatively slow data rate, the inventors have developed a new bi-directional interface that can be implemented via a single pin in the Photodiode-TIA module and little increase in circuit complexity for the TIA. The single-pin bi-directional interface of the invention is described hereafter.

For a preferred embodiment of the invention, two system-information signals are to be added to the system information exchanged between the Laser Driver and the Photodiode-TIA module of an SFF optical transceiver. The first signal is used to select gain bandwidth circuitry in the TIA to optimize both frequency and signal-to-noise response for each of the data rates from 155 Mb/s to 2.5 Gb/s—to thereby allow one receive module to be used with different rate systems. In addition, the TIA is required, in the Small Form Factor standard (SFF-8472), to report receive optical signal strength. If a pin were dedicated for each function, the receive module would require moving from a widely available 6-pin TO can package to a 7-pin package when an avalanche photodiode is used. The 7-pin package has fewer suppliers and those suppliers that do offer 7-pin TO-can packages have reported reliability problems due to pin crowding causing signal integrity problems and metal fatigue at the base of the joints.

In order to accommodate a single-pin bi-directional communications interface for these additional signals, without materially increasing the complexity of the TIA function, the inventors have developed an interface based on the use of a biasing arrangement to establish the direction of signal transmission on the interface and the use of timers to determine the duration of data transmission. Thus, with the method of the invention, the TIA sends signal strength information to the Laser Driver, and the Laser Driver sends rate setting data to the TIA over the same wire.

Particular aspects of the single-pin bi-directional interface of the invention are hereafter described in the context of four illustrative embodiments of the invention. In the first described embodiment, information is sent from the Laser Driver to the TIA in a single two-bit increment. The second and third embodiments send multiple two-bit words, and in the fourth embodiment, a simplified interface is described for sending multiple one-bit words.

I Illustrative Embodiment: Single 2-bit Word Transfer

Figure 2:
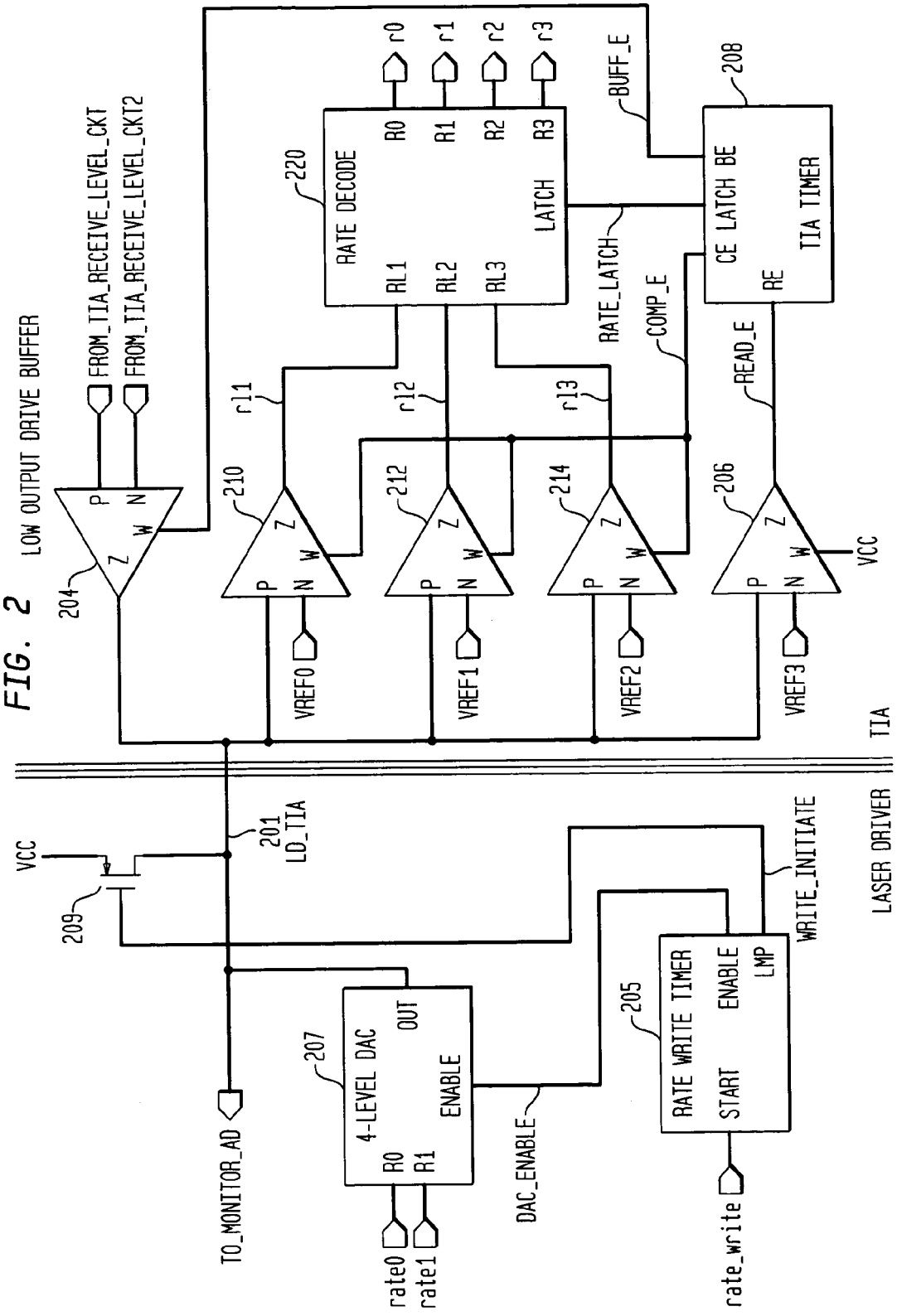
FIG. 2 shows a schematic view of components of an embodiment of the single-pin interface of the invention.

A schematic depiction of the elements of the single pin interface of the invention for communicating a single two-bit word from the Laser Driver to the TIA is shown in FIG. 2. As indicated in the figure, components of the interface associated with the Laser Driver are shown on the left side of the center dividing line and components of the interface associated with the TIA are shown on the right side of that divide. (It will of course be understood that both the Laser Driver and the TIA include other components for carrying out their other functions, but only the components associated with the interface of the invention are shown here for ease of illustration.)

In this embodiment of the invention, the maximum swing of the TIA receive signal power level is restricted to be less than the power supply voltage (VCC), and the Laser Driver is accordingly able to control the direction of signal flow on the LD_TIA Single-Conductor Interface 201 between the Laser Driver and the TIA by forcing the voltage on that line outside the allowed TIA drive range. In this manner, when the line is forced outside of the normal drive voltage range, the TIA is put into a listen mode and the Laser Driver then sends the data rate setting to the TIA. Timers are established in the TIA and Laser Driver to control the time duration for sending the rate setting information to the TIA and to permit the TIA to latch the setting. With the time-out of those timers, the interface then reverts back to the Laser-Driver receive mode, during which the TIA sends the receive signal strength signal to the Laser Driver. Note that, for a preferred embodiment of the invention, edge-triggered timers are used in the Laser Driver and TIA to simplify timing constraints.

With reference again to FIG. 2, the TIA Low Output Drive Buffer 204, which buffers the optical receive power level in the TIA, is designed to have relatively small output drive current and to have its maximum positive swing less than VREF3, which is a defined reference voltage level corresponding to the voltage level at which the signal direction of the single conductor interface between the Laser Driver and the TIA is switched. This switching point is sensed by Direction Sense Comparator 206, which operates to start TIA Timer 208. During the TIA listen mode, Comparators 210, 212 and 214 receive rate setting information from the Laser Driver and provide such information as in input to TIA Rate Decode 220.

On the Laser Driver side of the single pin interface of FIG. 2, 4 level Digital to Analog Converter (DAC) 207 receives the rate (rate 0 or rate 1) to be sent to the TIA from the System Interface/Controller 103 (of FIG. 1) and outputs it as an analog signal on the single line interface. Operation of DAC 207 is initiated by an enabling signal from Rate Write Timer 205. That Timer also drives switch 209 to apply supply voltage (VCC) to the single line interface when it is switched to an on state. Thus, when the Laser Driver is to set the TIA bandwidth (rate) setting, Controller 103 will present the rate information to DAC 207, and will then pulse Rate Write Timer 205 to initiate the Laser Driver—TIA rate setting process.

Figure 3:
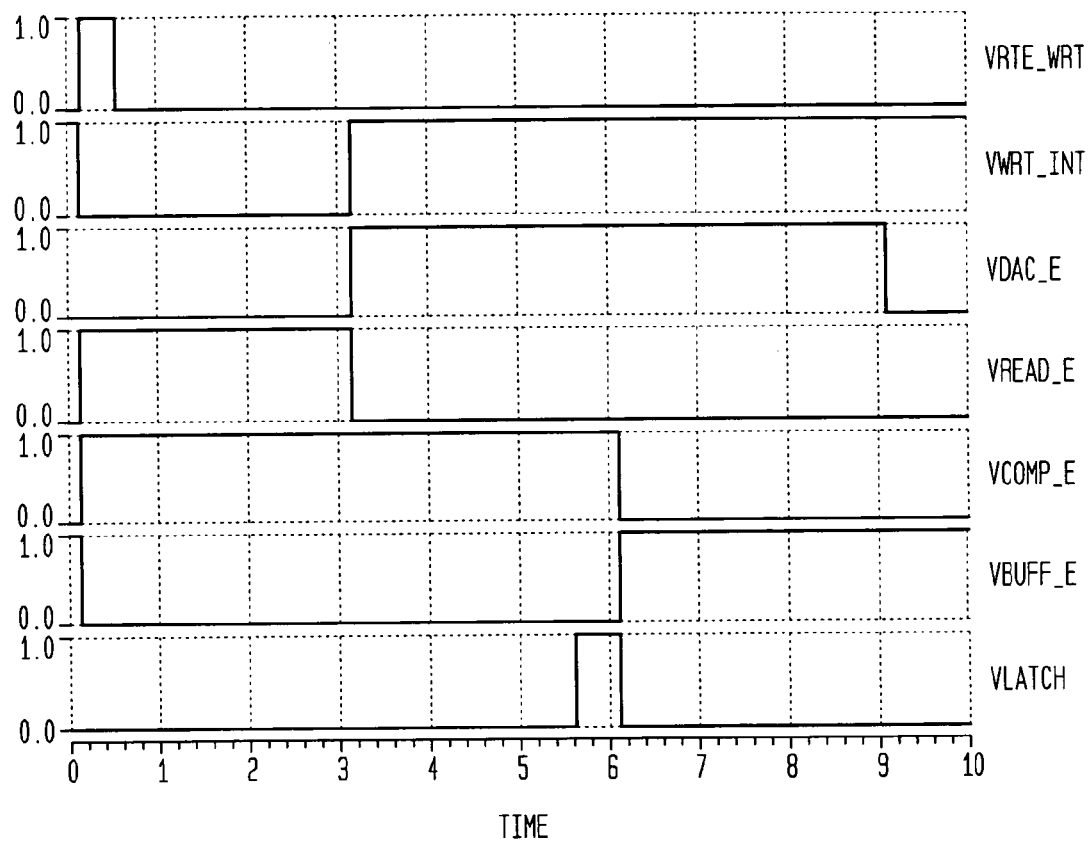
FIG. 3 is a timing diagram for operation of the embodiment of FIG. 2.

The inter-operation of the various components of the single line interface of FIG. 2 will be best understood by reference to FIG. 3, showing rate-setting timing sequences, in conjunction with FIG. 2. Note that the time axis in FIG. 3 is in arbitrary units. The purpose is to show the relative timing sequence, not absolute time values.

For purposes of the following illustrative description of the invention operation, it is assumed that the Laser Driver is operating in the receive mode—i.e., receiving signal-strength signals from the TIA, and that the invention then operates to reverse the direction of signal flow on the single line interface so as to place the TIA into its listen mode. The process by which the signal direction on the single-line interface of this embodiment is changed is hereafter described.

At a timing point just prior to the start of the signal direction changeover process—i.e., initiation of the Laser Driver Rate Write function (at TIME=0), the Laser Driver DAC 207 is in a powered down state and its output is in a high impedance state. Correspondingly, the 210-214 Comparators in the TIA are in a powered down state and Low Output Drive Buffer 204 is driving the Laser Driver Monitor A/D (not shown) with the optical receive power level signal. Direction Sense Comparator 206 is active and monitoring the voltage level on the LD_TIA Single-Conductor Interface 201.

At TIME=0.1, the Laser Driver initiates the TIA rate (bandwidth) setting function (i.e., placing the TIA in its listen mode) by pulsing the Rate_Write signal input to Rate Write Timer 205 (corresponding to the VRTE_WRT timing signal trace in FIG. 3). The timer is positive edge triggered to make the pulses for the enable signal to DAC 207, DAC_ENABLE (corresponding to the VDAC_E timing trace in FIG. 3), and the driving signal for Switch 209, WRITE_INITIATE (corresponding to the VWRT_INT timing trace in FIG. 3), independent of the Controller pulse width. In response to the Rate_Write signal at its input, the Rate Write Timer 205 initially drives the Write_Initiate signal to Switch 209 low, causing Switch 209 to turn on, thereby forcing the voltage level on the LD_TIA Single-Conductor Interface 201 up to the supply voltage level, VCC.

When Switch 209 pulls the LD_TIA Single-Conductor Interface 201 to VCC, TIA Direction Sense Comparator 206 sees a signal at its input greater than the direction-change reference voltage, VREF3, goes to a high state (corresponding to the VREAD_E timing signal in FIG. 3) and initializes the TIA Timer 208. In its initialization state, the TIA Timer 208 provides an enable signal, COMP_E (corresponding to the VCOMP_E signal trace in FIG. 3), to rate sensing Comparators 210-214 causing them to be turned on and ready to decode the rate signal information to be sent over the LD_TIA Single-Conductor Interface 201 from the Laser Driver. Also during the initialization state of the TIA Timer, a signal, BUFF_E (corresponding to the VBUFF_E signal trace in FIG. 3), is sent to the Low Output Drive Buffer 204 causing it to be powered down so it will not interfere with the rate setting signal from the Laser Driver DAC 207.

As will be readily apparent, no signal information can be transmitted via the Single Conductor Interface while it is clamped at VCC by operation of Switch 209. Accordingly, after a prescribed time interval, corresponding to the time needed for Direction Sense Comparator 206 to detect the switching voltage at its input and to drive TIA Timer 208 to its initialization state, Rate Write Timer 205 drives the Write_Initiate signal to Switch 209 high, causing Switch 209 to turn off, thereby removing the supply voltage from the LD_TIA Single-Conductor Interface 201. TIA Timer 208 is correspondingly held in its initialization state until the READ E signal from Direction Sense Comparator 206 goes low— with the removal of the supply voltage from the Single Conductor Interface by Switch 209 turning off.

Concurrent with the WRITE_INITIATE signal from Rate Write Timer 205 going high (and turning off Switch 209), the Timer provides the DAC_ENABLE signal at its ENABLE port to enable operation of DAC 207. Thus, the rate information for the TIA is not sent from the DAC until Switch 209 is turned off. As will be well understood by those skilled in the art, the required sequential timing events in Rate Write Timer 205 may be implemented as two analog timers in series or a digital counter with decoding logic.

At the same time that Rate Write Timer 205 sends the DAC_ENABLE signal to enable operation of the DAC 207, the timing operation of the TIA Timer starts—both events occurring with the WRITE_INITIATE signal from Rate Write Timer going high and turning off Switch 209. DAC 207 then turns on to provide a multi-level analog signal corresponding to the selected rate (set by bit rate0 and rate 1) and pulls the voltage level on the LD_TIA Single-Conductor Interface 201 below VREF3 in the TIA. Comparators 210-214 detect the rate setting based on the voltage output of the DAC.

An illustrative case for transmission and decoding of rate setting information sent from the Laser Driver to the TIA is described below in conjunction with Table 1. In the Table the outputs of the TIA decoding stages are shown as a function of representative DAC input and output levels. The DAC inputs are indicated as the rate0 and rate1 control bits, and the corresponding DAC Output is shown in the column so-named. In the TIA, outputs for Comparators 210-214 are shown for each input case in the columns labeled "rl 1," "rl 2" and "rl 3." The corresponding outputs for Rate Decode 220 are shown in the columns labeled "R 0," "R 1," "R 2" and "R 3." For this illustrative case, the TIA internal reference levels are selected as: VREF0=0.5, VREF1=1.5, VREF2=2.5, and VREF3>3.

TABLE 1

| rate 1 | rate 0 | DAC Output | rl 1 | rl 2 | rl 3 | r 0 | r 1 | r 2 | r 3 |
|---|---|---|---|---|---|---|---|---|---|
| 0 | 0 | 0 | 0 | 0 | 0 | 1 | 0 | 0 | 0 |
| 0 | 1 | 1 | 1 | 0 | 0 | 0 | 1 | 0 | 0 |
| 1 | 0 | 2 | 1 | 1 | 0 | 0 | 0 | 1 | 0 |
| 1 | 1 | 3 | 1 | 1 | 1 | 0 | 0 | 0 | 1 |

For the illustrative case depicted in the Table, when rate0=0 and rate1=0, the DAC Output is also 0. For this input case, TIA Comparators 210-214 all output 0 (rl 1-rl 3). Rate Decode 220 decodes these inputs from Comparators 210-214 as r0=1 and r1 to r3 all equal to 0. In the input case of rate0=1 and rate1=0 (2nd row of Table), the DAC Output is 1. Since VREF0=0.5 and VREF1 and VREF2 are greater than 1, only Comparator 210 outputs a 1, with Comparators 212 and 214 outputting 0. Rate Decode 220 translates this input from Comparators 210-214 into r1=1, r0=r2=r3=0. The other input cases can be observed from the Table. It is to be noted that the optimum Rate Decode format is a function of the specific TIA circuits to be controlled, and, accordingly, that Table 1 should be viewed simply as a representative format.

Returning to the timing process, the TIA Timer provides a signal, Rate_Latch (corresponding to the VLATCH signal in FIG. 3) to the latch input of Rate Decode 220 at it times out—to thereby latch the rate setting in the Rate Decode. The falling latch signal is also used reset the COMP_E and BUFF_E signals to thereby power down the Rate Comparators 210-214 and to power up the Low Output Drive Buffer 204.

The Laser Driver Rate Write Timer is preferably arranged to have a period longer than the longest expected TIA Timer period, in order to assure that the rate setting output of the DAC is maintained until the TIA has decoded and latched the rate. When the Laser Driver Rate Write Timer expires, the DAC is disabled (i.e., put into a high impedance state) and the Laser Driver again monitors the receive signal power level.

II Illustrative Embodiment: Extending Single-Pin Interface For Multiple Word Transfers A further embodiment of single-pin interface of the invention extended to multiple two-bit word transfers is illustrated schematically in FIG. 4. Note that, for the embodiment of FIG. 4, elements common to the embodiment illustrated in FIG. 2 maintain the same reference numbers as in FIG. 2. In this embodiment, a Register Bank 420 is added to the TIA to hold multiple words. Multiple words are transferred by assigning each word to a time slot in the Laser Driver. As with the single word interface of the prior embodiment, the Master Timer 408 (corresponding essentially to the TIA Timer of the prior embodiment) operates to maintain the TIA in the listen mode while the Laser Driver sends rate setting words to the TIA. However, the timing duration for Master Timer 408 is longer than one time slot of the Laser Driver Rate Write Timer. In this embodiment, the Data Timer 410 clocks the received and decoded rate setting data into the Register Bank 420 after waiting long enough for the data to be valid. The timing duration for TIA Data Timer 410 is shorter than the time slot for Laser Driver Rate Write Timer 205. To minimize the number of bits sent between the Laser Driver and TIA, the time slot number (first time slot number is 0, second is 1, etc.) is used as the register address the data is stored into. The Time Slot Counter 418 of FIG. 4 tracks the time slot number. The Time Slot Counter is synchronized to the Laser Driver Rate_Write input signal at the start of the transfer sequence.

Time Slot Counter 418 adds the capability of programming only the first x registers out of N in the TIA while leaving the contents of the N-x remaining registers unchanged. This feature is useful when all the register locations are programmed after power up and only a few settings need to be changed on an on-going basis.

Figure 4:
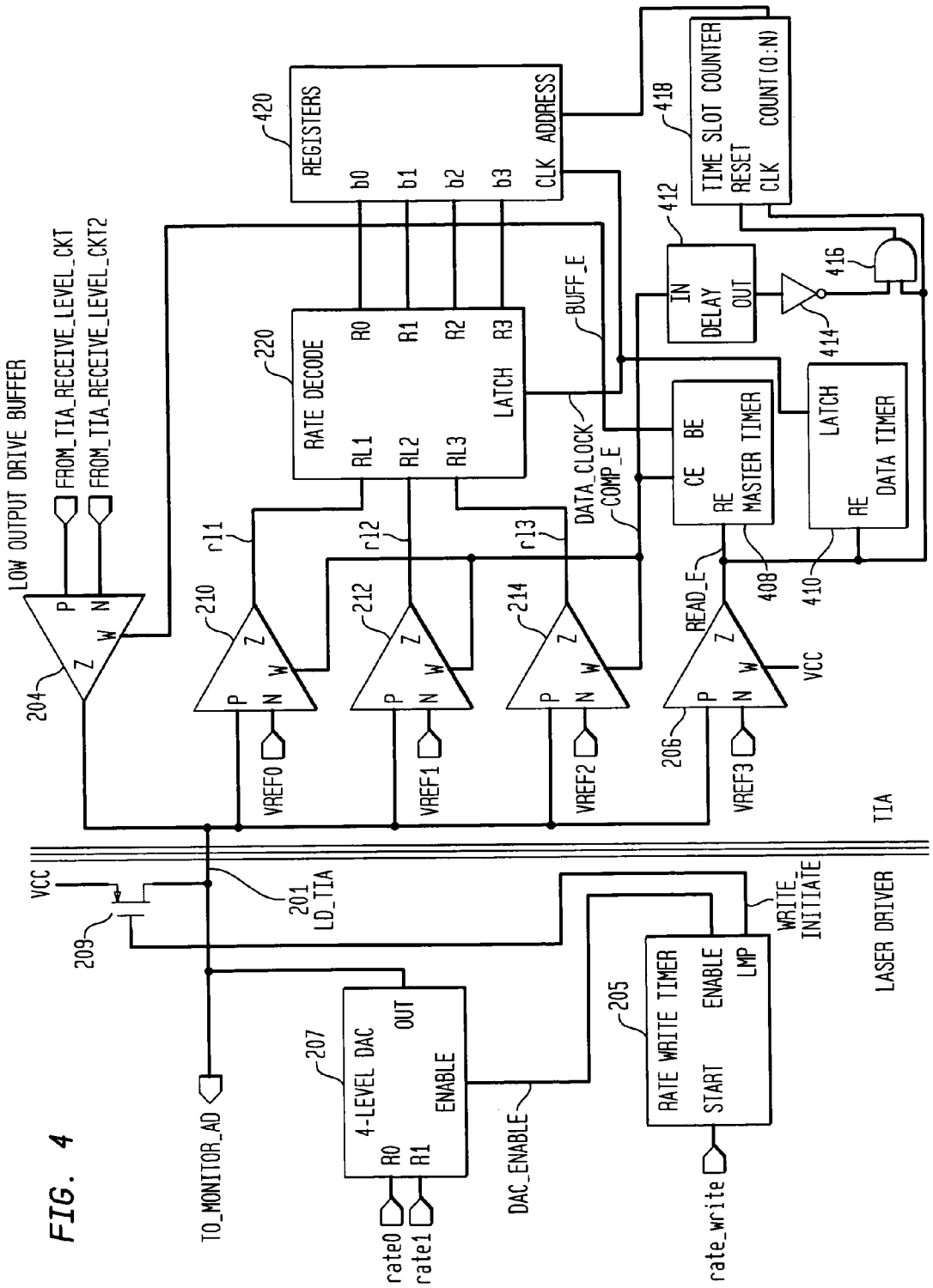
FIG. 4 shows a schematic view of components of another embodiment of the single-pin interface of the invention.
Figure 5:
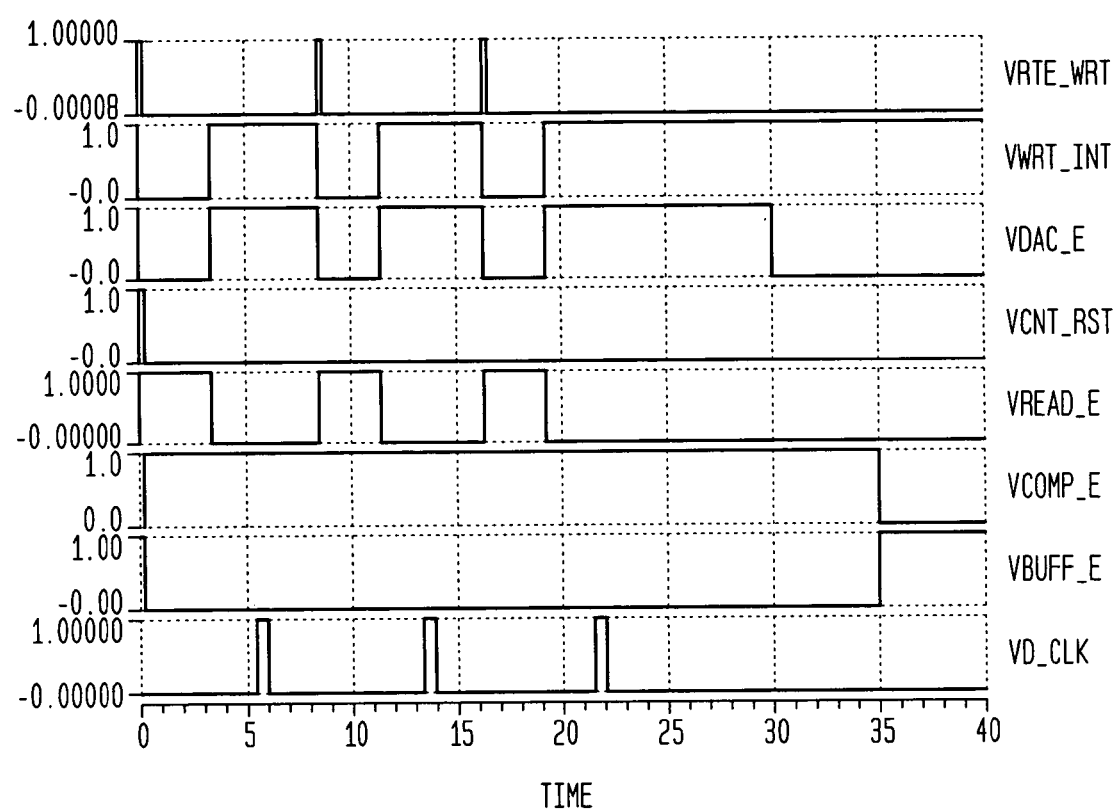
FIG. 5 is a timing diagram for operation of the embodiment of FIG. 4.

The interoperation of the various components of the single line interface of this embodiment will be best understood by reference to FIG. 5, showing rate-setting timing sequences, in conjunction with FIG. 4. Note again that the time axis in FIG. 5 is in arbitrary units.

As with the embodiment of FIG. 2, the description following begins with the Laser Driver is operating in the receive mode and then details the operation of the invention to reverse the direction of signal flow on the single line interface so as to place the TIA into its listen mode. The process by which the multiple word transfers of this embodiment is carried out is now described.

At Time=0 (left side of FIG. 5), the Laser Driver starts a TIA transfer sequence by pulsing the Rate Write input line to Rate Write Timer 205 (corresponding to the VRTE_WRT timing signal in FIG. 5). In response, the Write_Initiate signal line from the Rate Write Timer to Switch 209 goes low (corresponding to the VWRT INT timing signal of FIG. 5), causing Switch 209 to be turned on, thereby causing the LD_TIA Single-Conductor Interface line 201 to be pulled up to the supply voltage level, VCC. This causes the output of Direction Sense Comparator 206, READ_E, to go to a high state (corresponding to the VREAD_E timing signal in FIG. 5).

The Master Timer 408 and the Data Timer 410 are reset by the READ_E signal going high. The READ_E signal also clocks the rising edge triggered Time Slot Counter 418. As described below, the counter is reset only at the start of the transfer sequence.

The Master Timer CE output (COMP_E signal) is normally in the low state when the TIA is in its normal mode—i.e., sending receive optical signal strength to the Laser Driver. When the READ_E signal level goes high, the timer is reset, forcing CE high. Note that, although the READ_E signal cycles between high and low states during the multiple time slots (as explained below), CE remains high for more than one time slot independent of the state of the READ_E signal—as a function of timer operation and of retriggering the master timer (by READ_E going high) at start of new time slot.

As with the prior embodiment, the Data Comparators 210, 212 and 214 are turned on by the COMP_E signal (CE output) going high (corresponding to the VCOMP_E timing signal in FIG. 5). At the same time the BUFF_E output signal from Master Timer 408 (corresponding to the VBUFF_E timing signal in FIG. 5) goes low to disable the Low Output Drive Buffer 204.

The Master Timer is retriggered (reset) by the LD_TIA Single-Conductor Interface line 201 being pulled up to the VCC voltage level at the start of the next Laser Driver time slot. Note that the CE output of the Master Timer is low before the first time READ_E goes high (i.e., prior to beginning of first time slot) and returns to the low state after the MASTER TIMER times out upon completion of the data transfer sequence. Thus, the first time slot is detected by comparing a delayed version of the CE output (output of Delay cell 412) with the READ_E signal. The time slot detection process is described more particularly below.

Before the first time slot begins, all the TIA timers (Master and Data timers) are in their idle state and the COMP_E signal line is low. Inverter 414 provides a high input signal to AND Gate 416 by inverting the logic low output from Delay 412. At the start of the first time slot, the READ_E signal goes high (indicating that the Single Conductor Interface line has been pulled up to VCC), but the delayed version of COMP_E at output of Delay 412 is still low (indicating that, at an immediately prior time point, the Master Timer was in an idle state), and thus the Inverter input to AND Gate 416 remains high. The high READ_E signal, which is also provided as an input to AND Gate 416, causes the output of the AND Gate to go high, which resets Time Slot Counter 418 (corresponding to the start of the first time slot).

The Master Timer 408 drives the COMP_E signal high after the rising READ_E edge. The delay time of Delay 412 is designed to give enough time for Time Slot Counter 418 to properly reset before AND Gate 416 is disabled by COMP_E going high (and thus the inverted input to the AND Gate going low). Preferably, Time Slot Counter 418 is positive edge triggered with asynchronous reset to ensure the counter is in state zero before the data for the first time slot is clocked into Registers 420. The short duration reset pulse is shown by the VCNT_RST trace in FIG. 5.

As with the single word interface of the prior embodiment, the Rate Write Timer 205 sends an enable signal to the Laser Driver DAC 207 after the WRITE_INITIATE signal line goes back high (thus removing the VCC voltage level from the Single Conductor Interface line). Laser Driver DAC 207 operates to provide an analog representation of the rate0 and rate1 setting for successive two-bit words making up the multiple-word transfer of this embodiment. Those analog representations of the successive words are then transferred from the DAC onto the LD TIA Single-Conductor Interface line 201 in successive time slots—each word being transferred in one time slot.

The analog representation of each two-bit word in the multiple word message, as sent by DAC 207 to the TIA, is decoded by Comparators 210-214 and Rate Decode 220 in the same way as for the single time slot embodiment described above (see discussion related to the illustrative decoding operation depicted in Table 1). The TIA Data Timer 410 clocks in the data after waiting for the data to settle. This occurs for the first time slot at Time=5.5 (VD_CLK goes high) in the illustrative timing diagram of FIG. 5. The second time slot starts at Time=8 in FIG. 5. The Time Slot Counter 418 is not reset for this data-transfer interval since the COMP_E signal remains high from the initial time slot interval (and, being past the initial delay interval of Delay 412, the inverter input to AND Gate 416 remains low), thereby disabling the Time Slot Counter reset path. The Time Slot Counter toggles from state zero to state one on the rising READ_E edge. The processing of data on the Single Conductor Interface line for this time slot then proceeds as described for the first time slot. The third time slot starts at Time=16 in the timing diagram of FIG. 5 and data is latched at Time=21.5, following the same process as described above for the second time slot.

At this point (illustratively, Time=21.5), all of the data will have been transferred from the Laser Driver to the TIA (three time slots in this example). The Laser Driver DAC is disabled at TIME=30 (leaving a short guard time to assure proper latching of the TIA data) and the TIA Master Timer goes back to its idle state at Time=35, thereby putting the TIA back into its normal mode.

In the event one wished to transfer data with this embodiment using more than three time slots, that can be accomplished by simply adding more registers to Register Bank 420 and increase the number of states in Time Slot Counter 418.

III Illustrative Embodiment: Simplified 2-bit/cycle Interface

Figure 6:
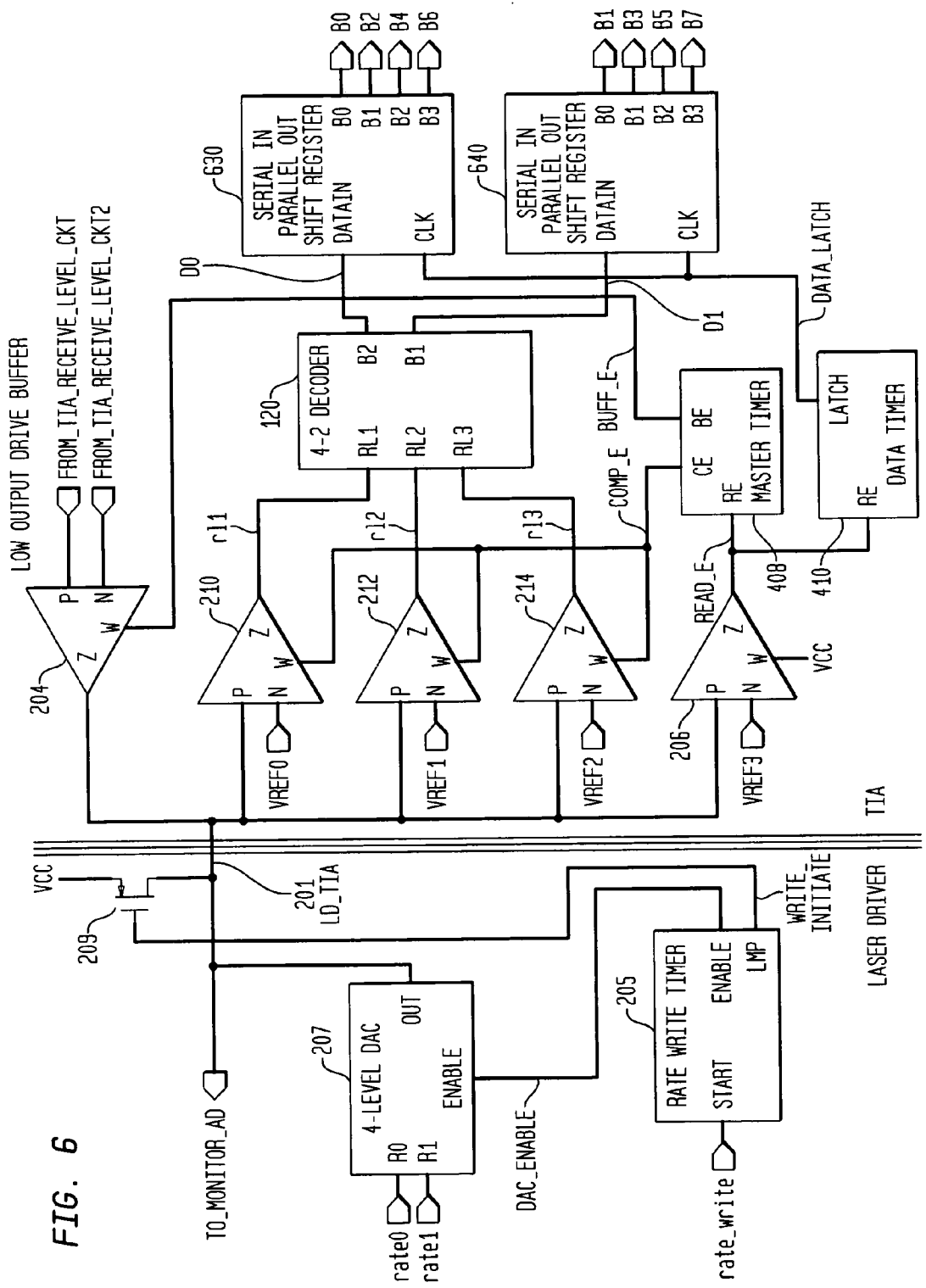
FIG. 6 shows a schematic view of components of still another embodiment of the single-pin interface of the invention.

A still further illustrative embodiment of single-pin interface of the invention for providing a simplified 2-bit/cycle interface is illustrated schematically in FIG. 6. As with the previously described embodiment, elements common to the embodiments illustrated in FIGS. 2 or 4 maintain the same reference numbers in FIG. 6. With reference to the figure, the Time Slot Counter and Rate Decode/Register Bank functions of the prior illustrative embodiment have been replaced with a 4-to-2 Decoder 620 and two Serial-In/Parallel-Out Registers 630 and 640. In this embodiment, the even bit positions are stored in Register 630 and the odd positions in the Register 640. Programming of the TIA in this embodiment is carried out by the Laser Driver writing (and transferring) enough words to update all the positions in the TIA Registers. Thus, with this embodiment the TIA is simplified relative to the embodiment of FIG. 4 (i.e., the counter is deleted) at the expense of the system having to rewrite all the TIA register positions if any bit needs to be changed. The operation sequence and control timing is the same as for the embodiment described in conjunction with FIG. 4 and will not be repeated here.

The flow of data into the serial-in/parallel-out shift registers is shown in detail in Table 2 for the illustrative case of three time slots. In the table, which is believed to be self explanatory, the data bit appearing at the output ports of each of the Registers (B0, 2, 4 & 6 for Register 630 and B1, 3, 5 & 7 for Register 640) is shown for each time slot. Note, as shown in FIG. 6, that D0 represents the output of 4-2 Decoder 620 provided as an input to Register 630 (even bit positions) and D1 represents the Decoder output to Register 640 (odd bit positions). The parenthetical numeral following the D0/D1 indicators in cells of the table correspond to the time slot in which that bit is decoded.

TABLE 2

| End of Time Slot No. | Register 630 | | | | Register 640 | | | |
|---|---|---|---|---|---|---|---|---|
| | B6 | B4 | B2 | B0 | B7 | B5 | B3 | B1 |
| 0 | D0(0) | | | | D1(0) | | | |
| 1 | D0(1) | D0(0) | | | D1(1) | D1(0) | | |
| 2 | D0(2) | D0(1) | D0(0) | | D1(2) | D1(1) | D1(0) | |
| 3 | D0(3) | D0(2) | D0(1) | D0(0) | D1(3) | D1(2) | D1(1) | D1(0) |

IV. Illustrative Embodiment: Simplified 1-bit/cycle Interface

Figure 7:
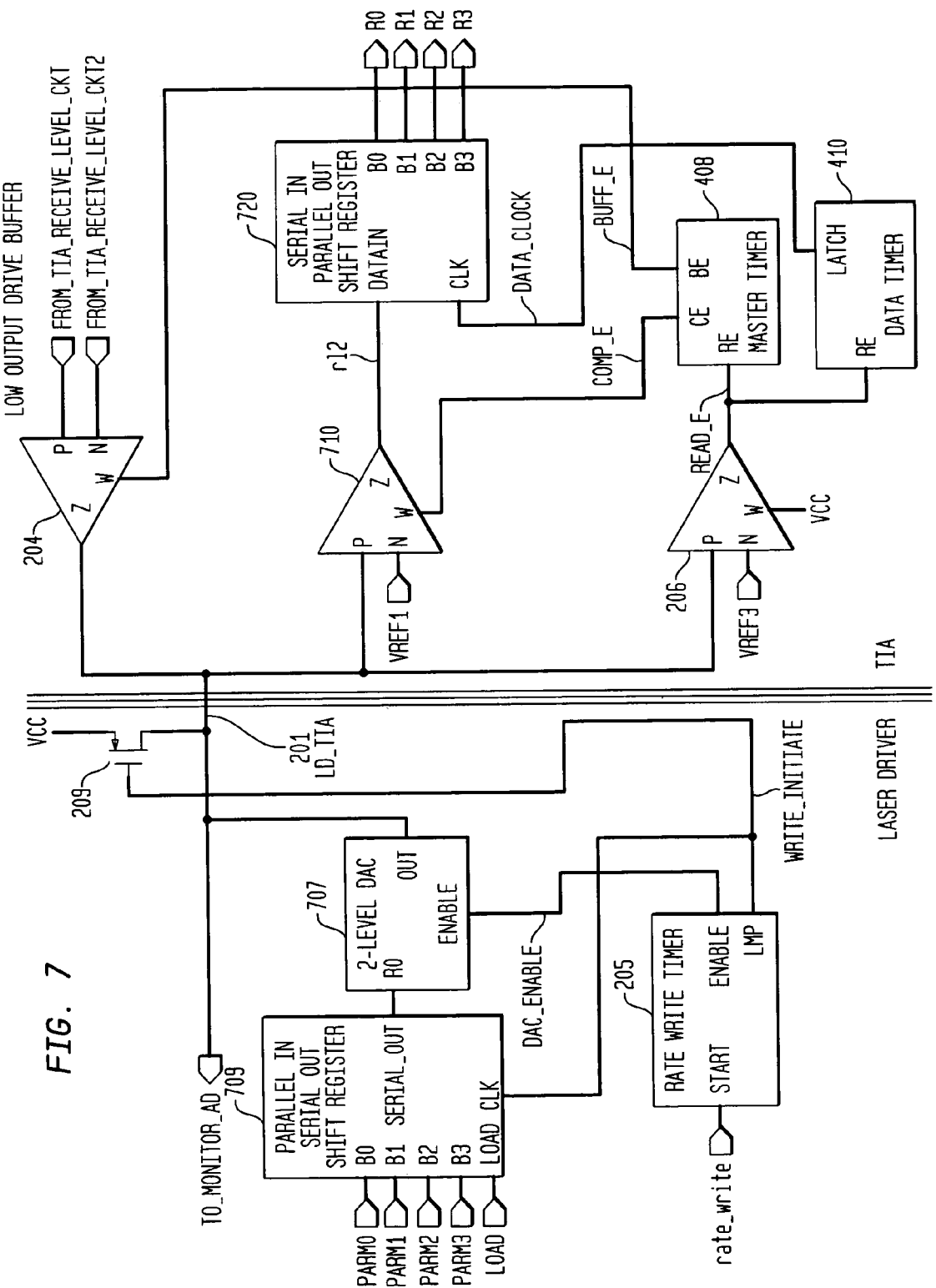
FIG. 7 shows a schematic view of components of a still further embodiment of the single-pin interface of the invention.

A still further illustrative embodiment of single-pin interface of the invention in which the interface is simplified to send only one bit per cycle is illustrated schematically in FIG. 7. In this embodiment, multiple bits are sent in multiple cycles. As with the previously described embodiments, elements common to the embodiments illustrated in FIGS. 2, 4 or 6 maintain the same reference numbers in FIG. 7. With reference to the figure, a Parallel To Serial Shift Register 709 is added to the Laser Driver for this embodiment to hold the bits that are to be sent to the TIA. Note, however, that this Register functions to lighten the load on the Laser Driver System Controller, and can be eliminated if the System Controller sends the data to the Laser Driver DAC one bit at a time The DAC 707 of this embodiment is simplified to only two levels (1 bit sent per cycle). The TIA is also simplified to have only two Comparators. Direction Sense Comparator 206 functions in the same manner as the Direction Sense Comparators of the previously-described embodiments—i.e., Comparator 206 detects when Switch 209 pulls the LD TIA Single Conductor Interface Line 201 above the normal operating voltage from the TIA Output Drive Buffer. The second TIA Comparator (710) detects the 2-level DAC output.

In this embodiment, the TIA decoding and register functions have been replaced with a Serial In/Parallel Out Register 720. To keep the interface simple, the TIA does not keep track of how many bits were sent. That function will be handled by the system that drives the Laser Driver for this embodiment. The TIA is programmed by sending enough bits to update all the locations in the TIA shift register. The simplified interface of this embodiment requires the Laser Driver to resend the full register contents if any bit is changed. Basic operation and control timing for this embodiment is the same as for the embodiments described in conjunction with FIGS. 4 and 5.

Numerous modifications and alternative embodiments of the invention will be apparent to those skilled in the art in view of the foregoing description. In particular, it should be understood that, while the single-conductor bi-directional interface of the invention has been described in conjunction with a particular application of that interface to an optical transceiver, the principle of the invention is applicable to any low data rate interface.

Accordingly, this description is to be construed as illustrative only and is for the purpose of teaching those skilled in the art the best mode of carrying out the invention and is not intended to illustrate all possible forms thereof. It is also understood that the words used are words of description,

What is claimed is:

1. A bi-directional single-conductor interface comprising:
   a switch configured for applying, during a first time interval, a voltage level to the bi-directional single-conductor interface that is outside a voltage operating range for the interface and for removing the applied voltage level at an end of the first time interval;
   a timer arranged to provide timing signals for said switch and for data transmission in a first direction, said data transmission via said single-conductor interface; and
   a digital-to-analog converter that operates to convert a data signal from a digital signal to an analog signal, the analog signal being applied to the single conductor interface;
   wherein said bi-directional single-conductor interface is a single line and the application and removal of said voltage level to said bi-directional single-conductor interface operates to cause said interface to transmit data in said first direction during a second time interval following said first time interval, and to transmit data in an opposite direction during other times, said second time interval being established in relation to said data-transmission timing signals.

2. The single conductor interface of claim 1 wherein the timer provides timing signals for at least the first and second time intervals.

3. The single conductor interface of claim 2 wherein the switch is configured to apply the voltage level to the interface in response to a timing signal at a beginning of the first time interval, and to remove the voltage level from the interface in response to a timing signal at an end of the first time interval.

4. The single conductor interface of claim 2 wherein said data signal is applied to the single conductor interface during the second time interval.

5. The single conductor interface of claim 1 further including a register for receiving a parallel input digital signal and for outputting a serial digital signal to the digital-to-analog converter.

6. The single conductor interface of claim 1 further including a decoder operative to receive a data signal applied to the interface, and to decode an information content thereof.

7. The single conductor interface of claim 6 further including a second timer operative to establish a timing duration for operation of the decoder.

8. The single conductor interface of claim 7 further comprising a comparator for comparing a voltage on the single-conductor interface with a reference voltage, the reference voltage being less than the voltage level applied to the interface by the switch, and for providing an output signal when the voltage on the interface exceeds the reference voltage.

9. The single conductor interface of claim 8 wherein the comparator output signal triggers operation of the second timer.

10. The single conductor interface of claim 6 wherein the decoder comprises one or more comparators for detecting a level of a received analog signal and a decode register for converting the detected analog signal level to an output digital value.

11. The single conductor interface of claim 6 further including a register receiving an output of the decoder, wherein multiple information words are transmitted via the single-conductor interface during successive time slots.

12. The single conductor interface of claim 6 wherein the decoder includes a register adapted to receive a serial input signal and to output a parallel digital value, and wherein the signal applied to the interface during the second time interval is input to the interface one bit at a time.

13. A method for providing a bi-directional single conductor interface comprising the steps of:
   applying a voltage level to the bi-directional single conductor interface that is outside a voltage operating range for the interface to provide a direction change signal and removing the applied voltage level at an end of a specified time duration;
   applying timing signals for said voltage-level application and for data transmission in a first direction, said data transmission via the single-conductor interface; and
   applying an analog signal to the single-conductor interface during a time interval, said analog signal output from a digital to analog converter that operates to convert a digital data signal to said analog signal:
   wherein said bi-directional single-conductor interface is a single line and the application and removal of said voltage level to said bi-directional single conductor interface operates to cause data to be transmitted via the interface in said first direction during said time interval, and in an opposite direction during other times, said time interval following said duration of said voltage-level application and being established in relation to said data-transmission timing signals.

14. The method of claim 13 comprising the further steps of:
   receiving the signal applied to the interface at a receiving node, the receiving node being in communication with the interface; and
   decoding an information content thereof.

15. The method of claim 14 wherein the step of receiving a signal includes the sub steps of:
   comparing a voltage measured on the single-conductor interface with a reference voltage, the reference voltage being less than the voltage level applied to the interface; and
   providing an output signal when the voltage on the interface exceeds the reference voltage, the output signal providing a trigger for an operation of decoding the received information.

16. The method of claim 14 wherein the step of decoding the information content includes the sub steps of:
   detecting a level of the received analog signal; and
   converting the detected analog signal level to an output digital value.

17. The method of claim 13, wherein multiple information words are transmitted via the single-conductor interface during successive time slots in an interval.

* * * * *